United States Patent
Miyaji et al.

(10) Patent No.: US 9,035,506 B2
(45) Date of Patent: May 19, 2015

(54) MOTOR HAVING HOLDER OF FLEXIBLE PRINTED CIRCUIT BOARD AND ACTUATOR USING SUCH MOTOR

(71) Applicant: MINEBEA CO., LTD., Kitasaku-gun, Nagano (JP)

(72) Inventors: Haruka Miyaji, Toyohashi (JP); Takayuki Matsui, Toyohashi (JP); Tomoyuki Suzuki, Kakegawa (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 267 days.

(21) Appl. No.: 13/718,530

(22) Filed: Dec. 18, 2012

(65) Prior Publication Data

US 2013/0193814 A1     Aug. 1, 2013

(30) Foreign Application Priority Data

Jan. 31, 2012   (JP) .................. 2012-017899

(51) Int. Cl.
*H02K 13/00*    (2006.01)
*H02K 5/22*     (2006.01)
*H02K 3/52*     (2006.01)

(52) U.S. Cl.
CPC ............. *H02K 13/00* (2013.01); *H02K 3/525* (2013.01); *H02K 5/225* (2013.01); *H02K 2211/03* (2013.01)

(58) Field of Classification Search
CPC ...................................... H02K 5/225
USPC .................. 310/68 D, 68 R, 49.01–49.55
See application file for complete search history.

(56) References Cited

U.S. PATENT DOCUMENTS

| 5,945,753 A | * | 8/1999 | Maegawa et al. ............ 310/68 B |
| 8,754,556 B2 | * | 6/2014 | Haruno et al. .................. 310/71 |
| 2003/0107278 A1 | * | 6/2003 | Agnes et al. .................... 310/89 |
| 2004/0041495 A1 | * | 3/2004 | Suzuki et al. ................. 310/259 |

FOREIGN PATENT DOCUMENTS

| JP | A-10-174410 | 6/1998 |
| JP | A-2002-119004 | 4/2002 |

* cited by examiner

*Primary Examiner* — Hanh Nguyen
(74) *Attorney, Agent, or Firm* — Oliff PLC

(57) ABSTRACT

A motor includes a rotor, a stator, an excitation coil, and a holder disposed on an outer side of the stator to hold a flexible printed circuit board supplying drive power, wherein the holder includes a main body mounting the flexible printed circuit board thereon, a bridging portion disposed along one of long sides on a first face a of the main body to form a first opening allowing the flexible printed circuit board to be inserted therethrough, and an engaging portion disposed along each of short sides on a second face of the main body to removably fit with a part of a terminal block of the excitation coil.

8 Claims, 4 Drawing Sheets

(a)

(b)

(a) cross section of
upper portion of bobbin (b) top view of bobbin

MOTOR HAVING HOLDER OF FLEXIBLE PRINTED CIRCUIT BOARD AND ACTUATOR USING SUCH MOTOR

TECHNICAL FIELD

The present invention relates to a motor connected to an external electric circuit by means of power-supplying such as a flexible printed circuit board.

BACKGROUND ART

In recent years, flexible printed circuit boards have been often used for connection between motors and external circuits. In the flexible printed circuit board, only soldered portions are structurally fixed and connected. Thus, the soldered portions tend to be moved when the flexible printed circuit board is pulled or the like by motor vibration or external force. Therefore, the soldered flexible printed circuit boards have been in danger of disconnection or fracture due to forces applied on their soldered portions. In particular, there are large possibilities of disconnection or fracture because of an acute angled edge of a solder fillet.

Conventionally, many means for reinforcement fixation or the like with adhesive tapes and adhesive agents have been employed to prevent disconnection or fracture. However, in the case of using the adhesive tapes, there are problems of an increase in cost for raw materials, an increase in cost for additional works such as stripping of release paper, generation of waste materials of release paper, and the like. Alternatively, in the case of using, the adhesive agents, there are problems of unstable quality, difficulty in control of the adhesive agents, time and facility requirements for dryness, tendency of the adhesive agents to adhere to an area other than adhesion-requiring areas, and the like. Furthermore, a method for reinforcement fixation using an adhesive tape or an adhesive agent has problems of time required for dryness as well as difficulty in long time maintenance of stable quality.

On the other hand, Japanese Unexamined Patent Application Publication No. 2002-119004 (Patent Literature 1) discloses a motor (FDD spindle motor) for preventing, a soldering contact from being disconnected due to pulling a flexible printed circuit board 3 without requiring reinforcement with tape or adhesion. Specifically, as shown in FIG. 5, the motor is configured such that the flexible primed circuit board 3 is engaged with an arm-shaped protrusion 7 that protrudes from an edge portion of a printed circuit board 1 constituting a stator of a motor. Such a configuration prevents the soldering contact from directly being subjected to pulling force even when the flexible printed board 3 is pulled. Here, reference numerals of the elements in this paragraph correspond to those given in Japanese Unexamined Patent Application Publication No. 2002-119004 (Patent Literature 1) but different from those in the present invention which will be described later.

Furthermore, Japanese Unexamined Patent Application Publication No. 10-174410 (Patent Literature 2) discloses a linear motor configured to prevent a flexible printed circuit board 8 from being subjected to local force application. Specifically, as shown in FIG. 6, a clamp 12 is mounted on a top surface of a bobbin 6 and made of the same heat-resistant electrical insulating resin as that of the bobbin 6, so that the clamp 12 pushes one end of the flexible printed board 8 against an upper end surface 6A of the bobbin 6 via a cushion 13. The cushion 13 is formed of a rubber plate or the like. Here, reference numerals of the elements in this paragraph correspond to those given in Japanese Unexamined Patent Application Publication No. 10-174410 (Patent Literature 2) but different from those in the present invention which will be described later.

However, the means disclosed in Japanese Unexamined Patent Application Publication No. 2002-119004 (Patent Literature 1) has problems of difficulty to mount the arm-shaped protrusion near a terminal of a motor due to a cylindrical shape of the motor and poor expectations in effects of preventing disconnection or fracture of the flexible printed circuit board even if the protrusion is mounted. Furthermore, there is another problem in that some of protruded portions for locking the flexible printed circuit boards are fixed in place and not independently removed when any repair is needed. The means disclosed in Japanese Unexamined Patent Application Publication No. 10-174410 (Patent Literature 2) has problems that there is no play at all because the flexible printed circuit board is tucked down by the clamp via the cushion and that versatility in installation of the flexible printed circuit board or the like is actually poor.

SUMMARY OF INVENTION

Technical Problem

The present invention has been made in consideration of the above problems. An object of the present invention is to provide a motor and an actuator using such the motor, where the motor comprises a holder that mounts a flexible printed circuit board accurately and firmly, and can prevent the flexible printed circuit board from disconnection or fracture to keep stable quality even after the mounting, while the holder can be removed together with the flexible printed circuit board when causing any trouble.

Solution to Problem

In order to attain the above object, the present invention provides (1); a motor comprising a rotor; a stator rotatably supporting the rotor; an excitation coil wound around the stator; and a holder disposed on an outer side of the stator, holding a flexible printed circuit board supplying drive power, wherein the holder comprises: a main body mounting the flexible printed circuit board thereon; a bridging portion disposed along one of long sides on a first face of the main body, forming a first opening allowing the flexible printed circuit board to be inserted therethrough; and an engaging portion disposed along each of short sides on a second face of the main body, removably fitting with a part of a terminal block of the excitation coil.

The present invention also provides (2); the motor according to (1), wherein the main body may have a plurality of second openings allowing a part of a plurality of terminals to be inserted therethrough.

The present invention also provides (3); the motor according to (2), wherein the main body may have an isolation wall disposed on the second surface, isolating the plurality of terminals inserted through the plurality of second openings from one another.

The present invention also provides (4); the motor according to any one of (1) to (3), wherein the first opening may have a longitudinal clearance of 1.3 to 1.6 times as huge as a thickness of the flexible printed circuit board.

The present invention also provides (5); an actuator comprising a motor according to any one of (1) to (3), a control circuit controlling the motor, and a gear train.

Advantageous Effects of Invention

A motor and an actuator using the motor according to the present invention mount a flexible printed circuit board accurately and firmly, and can also prevent the flexible printed circuit board from disconnection or fracture to keep stable quality even after the mounting, while the holder can be removed together with the flexible printed circuit board when causing any trouble.

DESCRIPTION OF EMBODIMENTS (First Embodiment)

Figure 1:
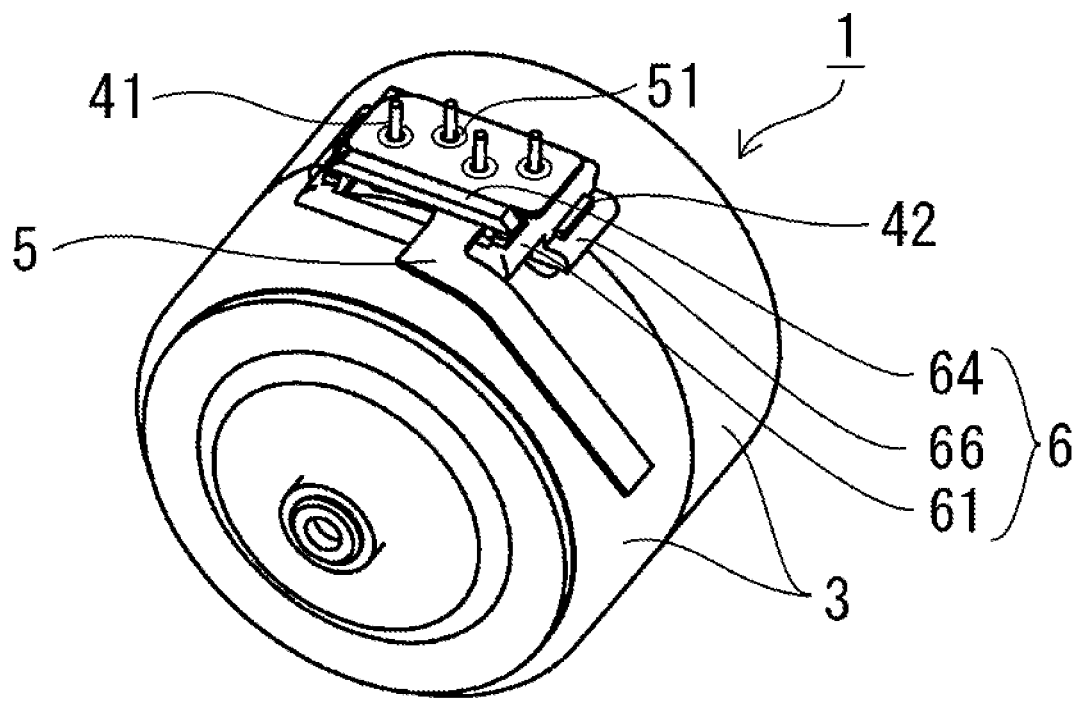
FIG. 1 is a schematic diagram illustrating an embodiment of a motor according to the present invention.
Figure 2:
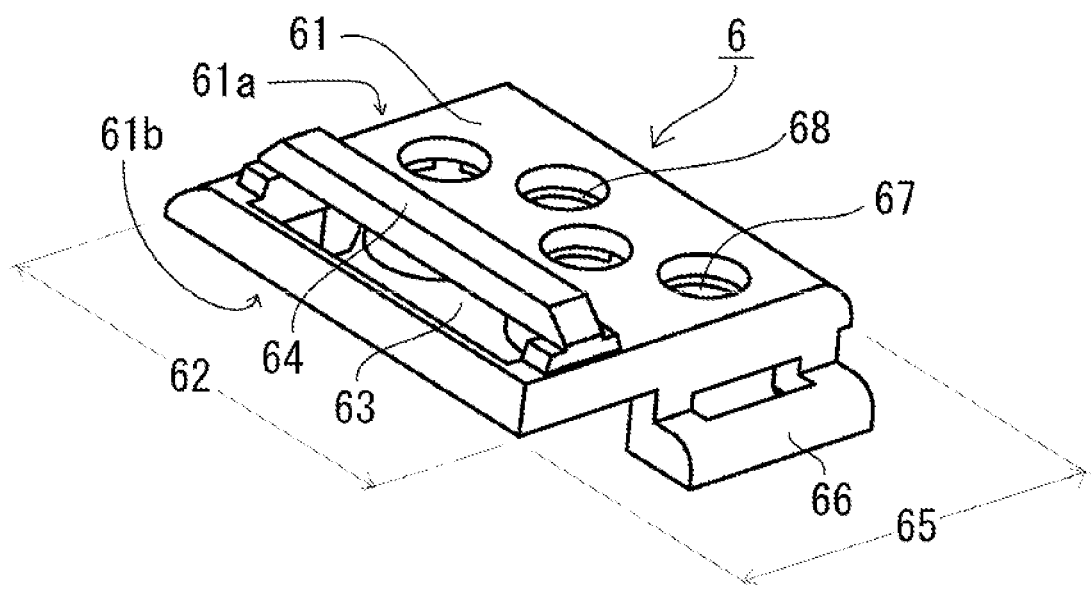
FIG. 2 is a schematic diagram illustrating a holder of a flexible printed circuit board.
Figure 3:
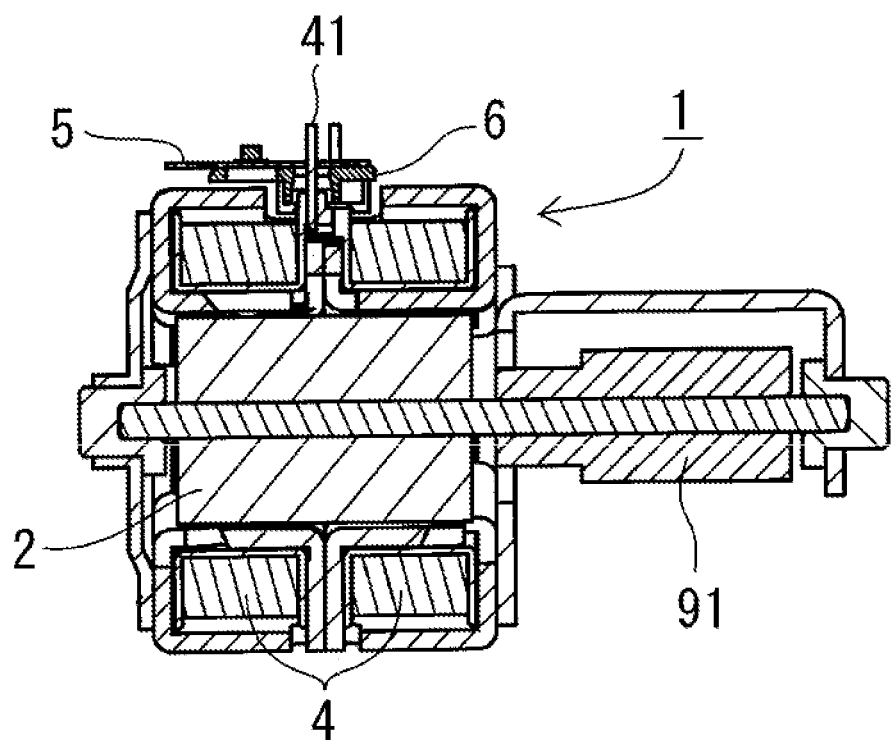
FIG. 3(a) is a cross-sectional view of an assembly of the motor according to the present invention and a first gear.
FIG. 3(b) is an expanded sectional view of a portion where the flexible printed circuit board and the holder for the flexible printed circuit board are attached together.
Figure 3:
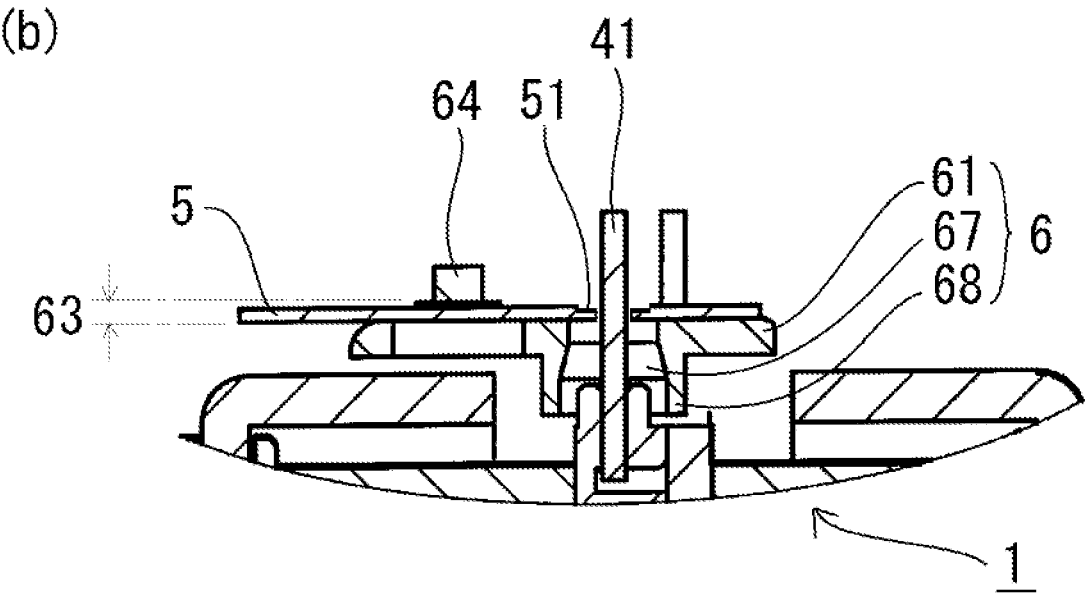

Hereinafter, an embodiment of a motor as a first embodiment according to the present invention will be described with reference to FIGS. 1 to 3. As shown in FIG. 1, a motor 1 comprises a rotor 2, a stator 3 that rotatably supports the rotor 2, an excitation coil 4 wound around the stator 3, and a holder 6 disposed on an outer side of the stator 3 to hold a flexible printed circuit board 5 that supplies drive power. A plurality of terminals 41 of the excitation coil 4 is protruded from a predetermined portion of the motor 1. As shown in FIG. 2, the holder 6 comprises a main body 61 that mounts the flexible printed circuit board 5 thereon, a bridging portion 64 disposed along one of long sides 62 on a first face 61a of the main body 61 to form a first opening 63 that lets the flexible printed circuit board 5 inserted therethrough, and an engaging portion 66 disposed along each of short sides 65 on a second face 61b of the main body 61 to removably fit with a part of a terminal block 42 of the excitation coil 4 and to entirely engage with each other.

Furthermore, as shown in FIG. 3(a) and FIG. 3(b), the main body 61 of the holder 6 has a plurality of second openings 67 that lets a part of a plurality of terminals 41 inserted therethrough, and an isolation wall 68 on the second face 61b, where the isolation wall 68 isolates the plurality of terminals 41 inserted through the plurality of second openings 67 from one another.

The flexible printed circuit board 5 and the holder 6 may be attached together as follows: First, the flexible printed circuit board 5 is inserted through the first opening 63 of the holder 6, and then temporary positioned to place soldering lands 51 respectively over the second openings 67 of the holder 6. Next, the engaging portion 66 of the holder 6 is fit with a part of the terminal block 42 of the excitation coil 4 of the motor 1 while the terminals 41 of the excitation coil 4 of the motor 1 are partially inserted through the soldering lands 51. Finally, soldering is performed on the soldering lands 51.

Here, the engaging portion 66 of the holder 6 can be defined along, an external form of the cylindrically shaped motor 1, and connected by engagement with a part of the terminal block 42. Thus, the engaging portion 66 of the holder 6 can be detached the holder 6 from the motor 1 when any trouble occurs on a connected portion between the flexible printed circuit board 5 and the motor 1.

When soldering, the first face 61a of the main body 61 of the holder 6 serves as a flat surface to receive the flexible printed circuit board 5. Thus, the main body 61 absorbs external force due to the soldering, external force due to handling, and the like, so that the flexible printed circuit board 5 can be prevented from being damaged.

The flexible printed circuit board 5 may be pulled at the time of handling for connecting the motor 1 to an external circuit or an external control device. In this case, the flexible printed circuit board 5, which is inserted through the first opening 63 formed between the bridging portion 64 and the main body 61 of the holder 6, can ease external force because the bridging portion 64 restricts vertical movement due to the external force.

As a result, the flexible printed circuit board 5 can be prevented from disconnection or fracture because external force does not directly effect on the connected portion, that is solder-fillet portion, between the terminal 41 of the motor 1 and the flexible printed circuit board 5.

Here, an isolation wall 68 is disposed on the side of the second face 61b of the second openings 67 of the main body 61. In other words, the isolation wall 68 is provided for preventing the adjacent other terminals 41 from being influenced by short circuit or the like even if solder flows or scatters to the second face 61b or solder whiskers are generated when soldering is performed on a soldering land 51 of the flexible printed circuit board 5. Therefore, the isolation wall 68 contributes an increase in reliability of the motor 1.

In FIG. 2, the isolation wall 68 is mounted to extend from the edge of the second opening 67, but its position and shape are not particularly limited thereto. For example, as far as an object of separating adjacent terminals 41 from each other can be attained the isolation wall 68 may be spaced from the edge of the second opening 67 or may partially have a cut without entirely surrounding the edge of the second opening 67.

In verifying the validity of this embodiment, the longitudinal size, or clearance, of the first opening 63 of the holder 6 was verified by contrasting it with the thickness of the flexible printed circuit board 5. Preferable results were obtained when the longitudinal direction of the first opening 63 was in the range of 0.3 to 0.35 mm with respect to the flexible printed circuit board 5 used in verification having a thickness of 0.225 mm. By expressing the results in ratio, the longitudinal size, or clearance, of the first opening 63 is in a range of 1.3 to 1.6 times as large as the thickness of the flexible printed circuit, board 5. Therefore, the results were that smaller than 1.3 times lead to difficulty to insert the flexible printed circuit board 5 through the first opening 63 and larger than 1.6 times lead to a decrease of the function of the bridging portion 64 to restrict the movement of the flexible printed circuit board 5.

The transverse direction size, or span, of the first opening 63 of the holder 6 may be set to have a function of restricting the movement of the flexible printed circuit board 5 depending on an external form of the flexible printed circuit board 5.

In this embodiment, the motor 1 is not limited to one having a specific structure. Alternatively, it may be a stepping motor or may be any one of other types of motors.

As above, the main body 61 of the holder 6 can stop movement of the flexible printed circuit board 5 to disperse external force against the flexible printed circuit board 5 from above and absorb the external force. Furthermore, the flexible printed circuit board 5, which is inserted through the first opening 63 formed by the bridging portion 64 of the holder 6, can restrict its movement with the bridging portion 64 under longitudinal external force. As a result, the flexible printed circuit board 5 can be prevented from disconnection or fracture by preventing the flexible printed circuit board 5, which is located near solder-fillet portion, from being deformed such that external force does not directly effect on the connected portion (in particular, solder-fillet portion) between the terminal 41 of the motor 1 and the flexible printed circuit board 5.

(Second Embodiment)

Figure 4:
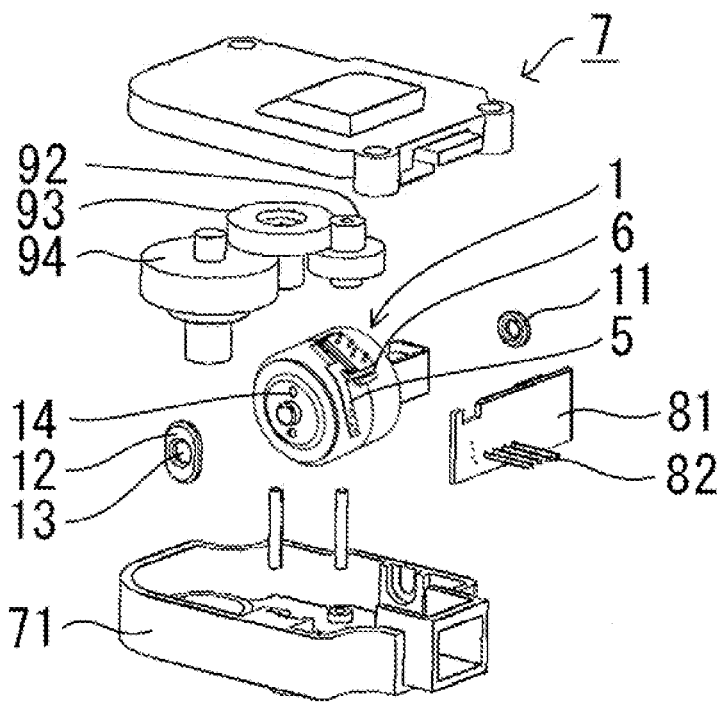
FIG. 4 is an exploded perspective view of the actuator using the motor concerning a the present invention.
Figure 5:
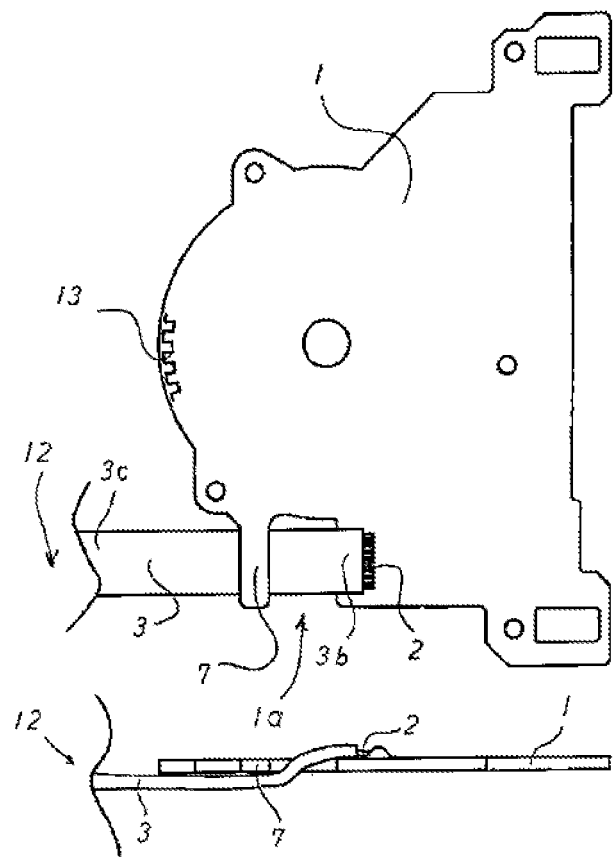
FIG. 5 is a diagram illustrating an example of the conventional means for connecting a flexible printed circuit board.
Figure 6:
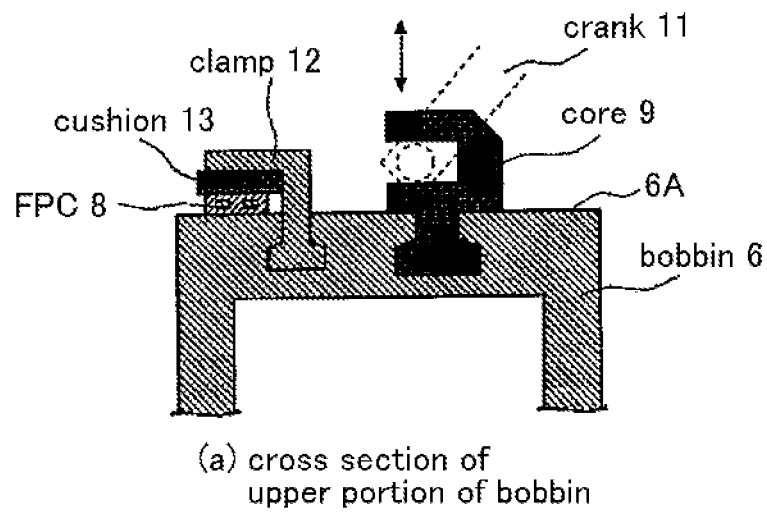
FIG. 6 is a diagram illustrating another example of the conventional means for connecting a flexible printed circuit board.
Figure 6:
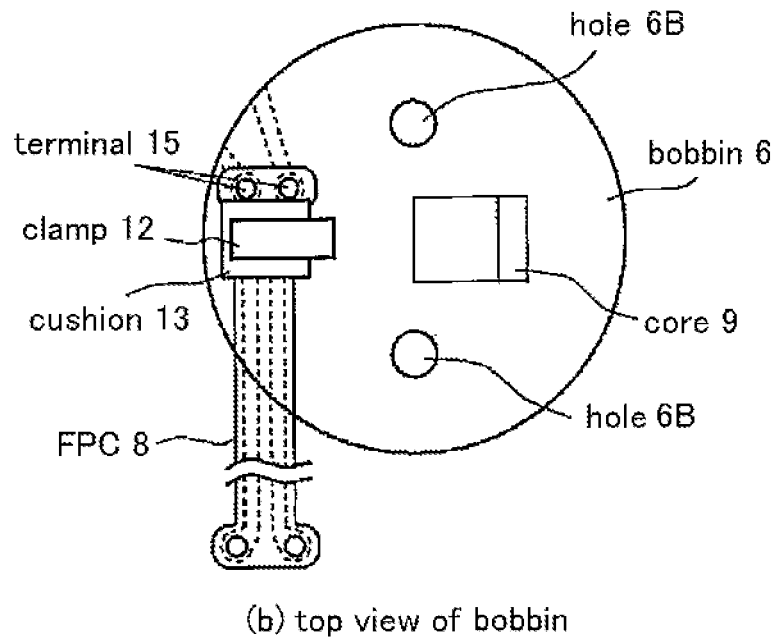

Next, an embodiment of an actuator as a second embodiment according to the present invention will be described with reference to FIG. 4. An actuator 7 comprises a motor 1 that generates driving force, a control circuit 8 that is mounted on a printed circuit board 81 and controls the motor 1, and a gear train 9 that transmits an output of the motor 1 outward. FIG. 4 illustrates an example in which the gear train 9 comprises a second gear 92, a third gear 93, and an output gear 94 as well as a first gear 91 that rotates together with an output axis of the motor 1. However, it is not limited to such a configuration. Alternatively, a suitable configuration can be made depending on the use of the actuator 7.

The flexible printed circuit board 5 having one end connected to a printed circuit board 81 is connected to the terminal 41 of the motor 1 via the aforementioned holder 6. External connection terminals 82 are outwardly formed on the outside of the printed circuit board 81.

FIG. 4 illustrates an example in which a generally circular elastic member 11 is fit to a bearing on the side of the first gear 91 of the motor 1 and a generally oval elastic member 12 is fit to a bearing on the opposite side. These elastic members 11 and 12 absorb vibration and noise of the motor 1 and made of materials, such as rubber. The elastic members 11 and 12 are all held in concaved portions formed in the inside of a case 71 of the actuator 7 to respectively prevent them from rotating.

The elastic member 12 has a through hole 13 in the center thereof, which can be fit with the bearing of the motor 1. Furthermore, the elastic member 12 has two convexed portions for preventing rotation, and these portions are located above and below the through hole 13 as a center on its inside, or the side thereof facing the motor 1 (not shown). These convexed portions fit with rotation-preventing concaved portions formed on the bottom of the motor 1 to further prevent the motor 1 and the case 71 from relative rotation.

The flexible printed circuit board 5 is electrically connected to the motor 1 such that, in one direction thereof, the soldering land 51 is inserted through the terminal 41 of the motor 1 and soldered to form electrical connection between them. The flexible printed circuit board 5 is, in the opposite direction thereof, electrically connected to the printed circuit board 81 mounted on the case 71 and thus electrically connected to the external connection terminals 82 formed on the printed circuit board 81. The motor 1 is not directly connected to the printed circuit board 81, but via the flexible printed circuit board 5, vibration and noise which are occurred when driving the motor 1 are absorbed by the elastic flexible printed circuit board 5.

If the terminal 41 of the motor 1 is directly connected to the printed circuit board 81, vibration and noise of the motor 1 will propagate from the terminal 41 of the motor 1 to the printed circuit board 81 and then to the case 71 on which the printed circuit board 81 is fixed. In contrast, propagation of vibration and noise to the case 71 can be reduced greatly after all by electrically connecting the flexible printed circuit board 5 between the terminal 41 of the motor 1 and the printed circuit board 81.

Therefore, in order to exert and maintain an advantage of intervention of the flexible printed circuit board 5, the connection between the flexible printed circuit board 5 and the motor 1 should be favorably kept not only at the time of connection but also during the operation period of the motor 1. The aforementioned holder 6 allows the flexible printed circuit board 5 to be correctly and securely soldered on the terminal 41 of the motor 1 because the main body 61 is configured to have the second openings 67 and the isolation wall 68. Furthermore, the aforementioned holder 6 contributes to prevent the soldered connection portion from disconnection or fracture by having the bridging portion 64 forming the first opening 63, even if external force is applied on the flexible printed circuit board 5 after the connection.

Industrial Applicability

The motor and actuator according to the present invention can be used in wide range of fields, for example office automation equipment such as a printer and a scanner, various kinds of communication equipment, and medical equipment as well as in-car equipment such as an automotive air conditioner.

REFERENCE SIGNS LIST

1 . . . Motor, 11 . . . Generally circular elastic member, 12 . . . Generally oval elastic member, 13 . . . Through hole, 14 . . . Concaved portion or through hole, 2 . . . Rotor, 3 . . . Stator, 4 . . . Excitation coil, 41 . . . Terminal, 42 . . . Terminal block, 5 . . . Flexible printed circuit board, 51 . . . Soldering land, 6 . . . Holder, 61 . . . Main body, 61a . . . First face, 61b . . . Second face, 62 . . . Long side, 63 . . . First opening, 64 . . . Bridging portion, 65 . . . Short side, 66 . . . Engaging portion, 67 . . . Second opening, 68 . . . Isolation wall, 7 . . . Actuator, 71 . . . Case, 8 . . . Control circuit, 81 . . . Printed circuit board, 82 . . . Terminal, 9 . . . Gear train, 91 . . . First gear, 92 . . . Second gear, 93 . . . Third gear, 94 . . . Output gear

CITATION LIST

Patent Literature

Patent Literature 1: Japanese Unexamined Patent Application Publication No. 2002-119004
Patent Literature 2: Japanese Unexamined Patent Application Publication No. 10-174410

The invention claimed is:

1. A motor, comprising:
a rotor;
a stator rotatably supporting the rotor;
an excitation coil wound around the stator; and
a holder disposed on an outer side of the stator, holding a flexible printed circuit board supplying drive power,
wherein the holder comprises:
  a main body mounting the flexible printed circuit board thereon and having a plurality of second openings allowing a part of a plurality of terminals to be inserted therethrough;
  a bridging portion disposed along one of long sides on a first face of the main body, forming a first opening allowing the flexible printed circuit board to be inserted therethrough; and
  an engaging portion disposed along each of short sides on a second face of the main body, removably fitting with a part of a terminal block of the excitation coil.

2. The motor according to claim 1, wherein the main body has an isolation wall disposed on the second surface, isolating the plurality of terminals inserted through the plurality of second openings from one another.

3. The motor according to claim 2, wherein the first opening has a longitudinal clearance of 1.3 to 1.6 times as large as a thickness of the flexible printed circuit board.

4. An actuator, comprising:
a motor according to claim 2;
a control circuit controlling the motor; and
a gear train.

5. The motor according to claim 1, wherein the first opening has a longitudinal clearance of 1.3 to 1.6 times as large as a thickness of the flexible printed circuit board.

6. An actuator, comprising:
a motor according to claim 1;
a control circuit controlling the motor; and
a gear train.

7. The motor according to claim 1, wherein the first opening has a longitudinal clearance of 1.3 to 1.6 times as large as a thickness of the flexible printed circuit board.

8. An actuator, comprising:
a motor according to claim 1;
a control circuit controlling the motor; and
a gear train.

* * * * *